United States Patent Office 2,802,015
Patented Aug. 6, 1957

2,802,015

11-OXYGENATED DERIVATIVES OF 13-METHYL-17-HYDROXY-17-(β-HYDROXYACETYL)-1,2,3,6,7,8,9,10,11,12,13,14,16,17-TETRADECAHYDRO-15H-CYCLOPENTA[a]PHENANTHREN-3-ONES AND ESTERS THEREOF

Frank B. Colton, Chicago, Ill., assignor, by mesne assignments, to G. D. Searle & Co., Skokie, Ill., a corporation of Delaware No Drawing. Application October 9, 1953,
Serial No. 385,288

6 Claims. (Cl. 260—397.45)

The present invention relates to a new group of organic polycyclic compounds and, more specifically, to the 11-hydroxy- and 11-oxo- derivatives of 13-methyl-17-hydroxy, 1, 2, 3, 6, 7, 8, 9, 10, 11, 12, 13, 14, 16, 17 - tetradecahydro-15H-cyclopenta[a]phenanthren-3 - ones substituted in the 17-position by a member of the class consisting of 17-(β-hydroxyacetyl) and 17-(β-alkanoyloxyacetyl) radicals.

The compounds which constitute this invention can be represented by the general structural formula

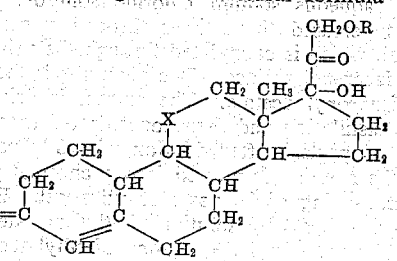

wherein X is a carbinol or carbonyl and R is a hydrogen, benzoyl, or a (lower alkyl)-CO— radical.

The compounds which constitute this invention can be prepared by methods described in applicant's following copending applications of which the present application is a continuation-in-part: Serial Number 286,611, filed May 7, 1952, issued as U. S. Patent 2,655,518 on October 13, 1953; Serial Number 357,377, filed May 25, 1953, issued as U. S. Patent 2,704,768 on March 22, 1955; and Serial Number 357,375, filed May 25, 1953, jointly by applicant and Dr. J. W. Ralls, issued as U. S. Patent 2,694,080 on November 9, 1954.

The compounds of my invention are of great value because of their unusual adrenocorticoid activity. Like their 10-methyl derivatives, they possess a neoglycogenetic effect. However, they differ from these 10-methyl derivatives in lacking some of the side reactions which limit their clinical applicability, in possessing a potent effect on stress resistance and in the ability to maintain life in adrenocortical deficiency states.

The examples below illustrate the compounds of my invention and the methods for their production. However, the invention is not to be construed as limited by the details set forth in spirit or in scope. It will be apparent to those skilled in the art that many modifications in materials and methods can be practiced without departing from the invention. In each of these examples temperatures are given in degrees centigrade (° C.) and relative amounts of materials in parts by weight.

Example 1

A stirred solution of 10.6 parts of 3-methoxy-13-methyl-1,4,6,7,8,9,11,12,13,14,16,17-dodecahydro - 15H-cyclopenta[a]phenanthren-17-one in 700 parts of anhydrous ether and 45 parts of dry toluene is cooled to 0° C. and saturated with dry acetylene. While a slow stream of acetylene is passed through the reaction mixture, a solution of 20 parts of potassium t-amylate in 135 parts of anhydrous tertiary amyl alcohol is added in the course of 15 minutes with stirring. Passage of acetylene and stirring are continued for an additional 4½ hours. After standing at 0° C. for 16 hours, the mixture is washed with aqueous ammonium chloride solution until the aqueous phase is neutral, then with water and saturated sodium chloride solution. The organic layer is dried over anhydrous sodium sulfate, filtered and concentrated under vacuum to a residue of about 250 parts. 500 parts of petroleum ether are added and, after standing at 0° C. for an hour, the mixture is filtered. The collected precipitate is recrystallized from ether. The resulting 3-methoxy-13-methyl-17 - ethynyl - 1,4,6,7,8,9,11,12,13,14,16,17-dodecahydro-15H-cyclopenta[a]phenanthren - 17-ol melts at about 181–182° C. The rotation as determined in a 1% chloroform solution is $[\alpha]_D = +65°$. An additional amount of this product can be obtained from the mother liquors by concentration under vacuum followed by addition of petroleum ether.

To a refluxing solution of 47.5 parts of 3-methoxy-13-methyl-17-ethynyl-1,4,6,7,8,9,11,12,13,14,16,17 - dodecahydro-15H-cyclopenta[a]phenanthren-17-ol in 3200 parts of methanol and 1000 parts of water are added 240 parts of concentrated hydrochloric acid. Refluxing is continued for an additional 5 minutes after which the solution is maintained at room temperature for 15 minutes. Then 13,000 parts of water are added and the mixture is cooled to 0° C. After standing for several hours at that temperature, the mixture is filtered and the precipitate is dried and crystallized from ethyl acetate. The 13-methyl-17-ethynyl-17-hydroxy - 1,2,3,6,7,8,9,10,11,12,13,14,16,17-tetradecahydro-15H-cyclopenta[a]phenanthren-3-one thus obtained melts at about 202–204° C. The specific rotation, as determined in a 1% chloroform solution, is $[\alpha]_D = -22.5°$. The ultraviolet absorption spectrum of a methanolic solution shows a maximum at 241 millimicrons with a molecular extinction coefficient of 17,100.

A solution of 53.7 parts of 13-methyl-17-ethynyl-17-hydroxy-1,2,3,6,7,8,9,10,11,12,13,14,16,17 - tetradecahydro-15H-cyclopenta[a]phenanthren-3-one in 1500 parts of dioxane and 1000 parts of pyridine is reduced in an atmosphere of hydrogen over 30 parts of a catalyst containing 5% palladium on calcium carbonate. On absorption of one molecule of hydrogen the reduction is stopped and the mixture is filtered. The filtrate is concentrated under vacuum to about 500 parts, diluted with 3000 parts of ether and washed with normal hydrochloric acid until a Congo red test shows an acidic reaction. The solution is washed successively with water, 5% sodium bicarbonate, water and saturated sodium chloride solution. The ether extract is dried over sodium sulfate, concentrated on the steam bath to about 500 parts and diluted with 800 parts of petroleum ether. After storage at 0° C. for 16 hours, the product is collected on a filter, dried and crystallized from a mixture of ethyl acetate and petroleum ether. The 13-methyl-17-vinyl-17-hydroxy-1,2,3,6,7,8,9,10,11,12,13,14,16,17-tetradecahydro - 15H - cyclopenta[a]phenanthren-3-one thus obtained melts at about 169–171° C. The rotation of an alcoholic solution is $[\alpha]_D = +36°$.

A solution of 47.3 parts of phosphorus tribromide in 645 parts of anhydrous ethanol-free chloroform is added dropwise to a solution of 142.9 parts of 13-methyl-17-vinyl-17-hydroxy-1,2,3,6,7,8,9,10,11,12,13,14,16,17-tetradecahydro-15H-cyclopenta[a]phenanthren-3-one in 2250 parts of chloroform and 10 parts of pyridine, maintained at −20° C. After standing at room temperature for 16 hours, the mixture is treated with chloroform and then successively with dilute hydrochloric acid, dilute sodium bicarbonate solution and finally with water. After drying over anhydrous sodium sulfate, the chloroform is stripped off, leaving as a residue the 17-(β - bromoethylidene) - 13 - methyl - 1,2,3,6,7,8,9,10,11,12,13,14,16,17 - tetradecahydro - 15H - cyclopenta[a]phenanthren-3-one.

45 parts of 17-(β-bromoethylidene)-13-methyl-1,2,3,-6,7,8,9,10,11,12,13,14,16,17-tetradecahydro - 15H - cyclopenta[a]phenanthren-3-one are treated with 400 parts of freshly fused potassium acetate and refluxed for 5 hours in 3200 parts of dry acetone. After cooling the precipitate is removed by filtration and the acetone is distilled in vacuum under nitrogen. The residue is extracted by refluxing with boiling petroleum ether and, after stripping of the solvent in vacuo, the residue is chromatographed over 4500 parts of silica gel. Elution with a 3% solution of ethyl acetate in benzene, evaporation of the solvent from the eluate and crystallization of the residue from aqueous acetone and petroleum ether yields 13-methyl-17-vinyl-1,2,3,6,7,8,9,10,11,12,13,14-dodecahydro-15H-cyclopenta[a]phenanthren-3-one, melting at about 100–101° C. The specific rotation of an 0.66% chloroform solution is $[\alpha]_D = +111°$. The ultraviolet absorption spectrum of a methanolic solution shows a maximum at 237 millimicrons with a molecular extinction coefficient of 30,200. This compound has the structural formula

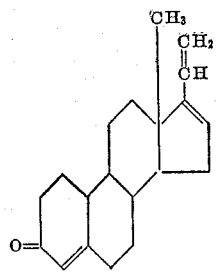

Elution of the chromatography column with a 10% solution of ethyl acetate in benzene, evaporation of the solvent from the eluate and crystallization of the residue from aqueous acetone yields the 17-(β-acetoxyethylidene)-13-methyl - 1,2,3,6,7,8,9,10,11,12,13,14,16,17-tetradecahydro - 15H - cyclopenta[a]phenanthren - 3 - one. This compound is obtained in two polymorphic crystalline forms, one melting at 49–50° C., the other melting at about 96–97° C. The specific rotation of a 1% chloroform solution is $[\alpha]_D = +63°$. The ultraviolet absorption spectrum of a methanolic solution shows a maximum at 241 millimicrons with a molecular extinction coefficient of 17,800. This compound has the structural formula

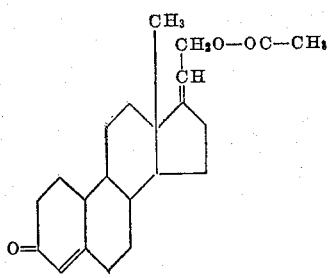

*Example 2*

1000 parts of a 2-N potassium hydroxide solution in 75% aqueous methanol are treated with 45.9 parts of 17-(β-acetoxyethylidene)-13-methyl - 1,2,3,6,7,8,9,10,11,-12,13,14,16,17-tetradecahydro-15H-cyclopenta[a]phenanthren-3-one and refluxed for 17 minutes. Water is added to turbidity and the mixture is cooled to 0° C. The precipitate is collected on a filter, washed with water and dissolved in ethyl acetate. The solution is decolorized with charcoal, concentrated to one-third of its volume and treated with petroleum ether to induce crystallization. The 17-(β-hydroxyethylidene)-13-methyl-1,2,3,6,7,- 8,9,10,11,12,13,14,16,17-tetradecahydro-15H - cyclopenta[a]phenanthren-3-one thus obtained melts at about 151–153° C. The identical product is obtained by alkaline hydrolysis in methanol of the 17-(β-bromoethylidene)-13-methyl - 1,2,3,6,7,8,9,10,11,12,13,14,16,17-tetradecahydro-15H-cyclopenta[a]phenanthren-3-one obtained in Example 1. A mixed melting point test of the material obtained by these two methods shows no depression. A 1% chloroform solution shows an optical rotation $[\alpha]_D = +51°$. The product has the structural formula

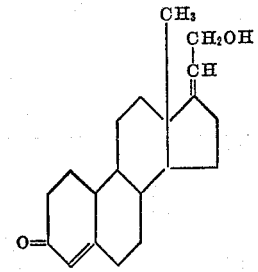

*Example 3*

1 part of 13-methyl-17-hydroxy-17-(β-acetoxy-ethylidene)-1,2,3,6,7,8,9,10,11,12,13,14,16,17 - tetradecahydro-15H-cyclopenta[a]phenanthren-3-one is stirred with 5000 parts of citrated beef blood and 5000 parts of 0.85% aqueous sodium chloride solution. This solution is perfused three times through a surviving beef adrenal, which is cannulated through the vein and has a finely lacerated surface. The perfusate is then extracted with isopropyl acetate. The extract is dried by azeotropic distillation and then concentrated to a residue of about 20 parts. After dilution with 380 parts of benzene the solution is poured into a chromatography column consisting of 90 parts of silica gel. Elution with 1200 parts of a 10% solution of ethyl acetate in benzene and 600 parts of a 20% solution of ethyl acetate in benzene yields mainly cholesterol. The column is then eluted with 600 parts of a 33% solution of ethyl acetate in benzene; concentration yields the 13-methyl-17-(β-hydroxylethylidene) - 1,2,3,6,7,8,9,10,11,12,13,14,16,17-tetradecahydro-15H-cyclopenta[a]phenanthren - 3 - one, which recrystallized from petroleum ether, melts at about 152–154° C.

The column is washed with 1200 parts of a 50% and with 300 parts of a 66% solution of ethyl acetate in benzene. Subsequent elution with 300 parts of a 33% solution and 600 parts of a 20% solution of benzene in ethyl acetate yields 11β-hydroxy-13-methyl-17-(β-hydroxyethylidene)-1,2,3,6,7,8,9,10,11,12,13,14,16,17-tetradecahydro - 15H-cyclopenta[a]phenanthren-3-one which, crystallized twice from ethyl acetate, melts at about 168–170° C. This compound gives a negative blue tetrazolium test and a 1% chloroform solution shows a molecular rotation of $[\alpha]_D^{20} = +89°$. The ultraviolet absorption spectrum has a maximum at 242 millimicrons with a molecular extinction coefficient of 17,300. This compound has the structural formula

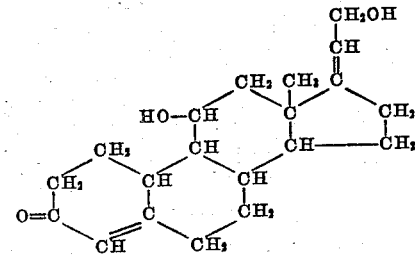

*Example 4*

A mixture of 90 parts of 11β-hydroxy-13-methyl-17-(β-hydroxyethylidene)-1,2,3,6,7,8,9,10,11,12,13,14,16,17-tetradecahydro-15H-cyclopenta[a]phenanthren-3-one, 139 parts of sodium acetate, 700 parts of acetic anhydride and 1000 parts of glacial acetic acid is kept at room temperature for 4 hours and then treated by the gradual addition of chipped ice to induce crystallization. After standing for 1 hour the reaction mixture is filtered and the material collected on the filter is dried. The 11β-hydroxy-13-methyl-17-(β-acetoxyethylidene)-1,2,3,6,7,8,-9,10,11,12,13,14,16,17 - tetradecahydro - 15H-cyclopenta-[a]-phenanthren-3-one thus obtained melts at about 123–124° C. The ultraviolet absorption spectrum of a methanolic solution shows a maximum at 242 millimicrons with a molecular extinction coefficient of 17,500.

*Example 5*

To a mixture of 119 parts of 11β-hydroxy-13-methyl-17 - (β-acetoxyethylidene)-1,2,3,6,7,8,9,10,11,12,13,14,16,17 - tetradecahydro-15H-cyclopenta[a]phenanthren-3-one in 2000 parts of butanol and 46 parts of hydrogen peroxide in 3000 parts of butanol, 11 parts of osmium tetroxide in 1000 parts of butanol are added in the course of 12 minutes. An additional quantity of 11 parts of osmium tetroxide in 1000 parts of butanol is added in the course of the following 2 hours at room temperature to the reaction mixture which turns greenish-brown upon standing at room temperature for 24 hours. Then 20,000 parts of water are added and the mixture is concentrated under vacuum to one-fifth of its original volume. The residue is extracted with ethyl acetate and is dried over anhydrous sodium sulfate and concentrated under vacuum. The resulting residue is taken up in aqueous methanol and treated with 50 parts of aqueous sodium sulfite. After refluxing for 30 minutes the reaction mixture is concentrated, diluted with water and extracted with ethyl acetate. The extract is dried over sodium sulfate, filtered and evaporated to dryness. The residue is dissolved in a 10% solution of ethyl acetate in benzene and applied to a silica gel chromatography column. The column is rinsed with benzene and 10% ethyl acetate in benzene. Elution with a 50% solution of ethyl acetate in benzene yields 11β,17-dihydroxy-17-(β-hydroxyacetyl)-1,2,3,6,7,8,9,10,11,12,13,14,16,17 - tetradecahydro - 15H-cyclopenta[a]phenanthren-3-one which has the structural formula

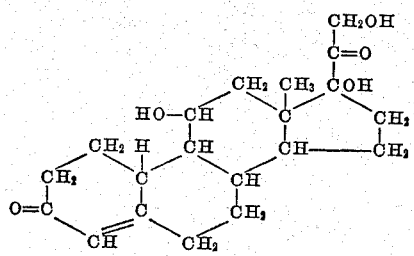

The compound gives a positive blue tetrazolium test. The ultraviolet absorption spectrum shows a maximum at 242 millimicrons with a molecular extinction coefficient of about 17,300.

*Example 6*

To a solution of 22 parts of 11β,17-dihydroxy-17-(β-hydroxyacetyl) - 1,2,3,6,7,8,9,10,11,12,13,14,16,17 - tetradecahydro-15H-cyclopenta[a]phenanthren-3-one in 500 parts of pyridine are added 325 parts of acetic anhydride. The mixture is permitted to stand at room temperature for 90 minutes. Then ice is added and, after 45 minutes, the reaction mixture is treated with 0.5-N hydrochloric acid. The mixture is extracted with ethyl acetate and the extract is washed with water, saturated with sodium bicarbonate and again with water, dried and evaporated under vacuum. The residue is applied to a silica gel chromatography column. Elution with a 40% solution of ethyl acetate in benzene yields an acetyl derivative which on recrystallization from acetone and water, melts at about 208–211° C. The infrared absorption spectrum shows maxima at 2.88, 5.71, 5.78, 6.03, 6.21, 6.90, 7.08, 7.30, 7.52, 7.88, 8.10, 8.32, 8.82, 9.03, 9.50, 10.06, 10.22, 10.78, 11.06, 11.22, 11.53, 11.77, 12.72 and 12.90 microns.

To 234 parts of this acetyl derivative are added 44 parts of chromic acid in 0.1-N glacial acetic acid solution. The mixture is stirred for 30 minutes at room temperature, diluted with water and extracted with chloroform. The chloroform extract is washed successively with 5% aqueous sodium bicarbonate solution and water and evaporated to dryness. The 13-methyl-17-hydroxy-17-(β-acetoxyacetyl)1,2,3,6,7,8,9,10,11,12,13,14,16,17 - tetradecahydro-15H-cyclopenta[a]phenanthrene-3,11-dione is recrystallized from ethyl acetate and obtained in beautiful colorless crystals. The ultraviolet absorption spectrum of a methanolic solution shows a maximum at about 239 millimicrons with an extinction coefficient of about 16,750. The infrared absorption spectrum shows maxima of 2.75, 2.85, 5.83, 6.02, 6.20 and an inflection point at 5.76 microns. The compound gives a positive blue tetrazolium test.

*Example 7*

A mixture of 29 parts of 13-methyl-17-hydroxy-17-(β - acetoxyacetyl) - 1,2,3,6,7,8,9,10,11,12,14,16,17-tetradecahydro-15H-cyclopenta[a]phenanthrene-3,11 - dione in 1500 parts of 85% aqueous methanol and 1800 parts of hot aqueous 1-N hydrochloric acid is refluxed under a nitrogen atmosphere for 5 hours, chilled and concentrated in vacuum to one-fourth of its original volume. After cooling to 0° C., the product is collected on a filter. Colorless crystals are obtained on recrystallization from ethyl acetate. The product gives a positive blue tetrazolium test. The ultraviolet absorption spectrum of a methanolic solution gives a maximum at about 239 millimicrons with an extinction coefficient of about 16,900. The infrared absorption spectrum shows maxima at 2.77, 2.83, 5.83, 6.02 and 6.20 microns. The 13-methyl-17-hydroxy-17 - (β-hydroxyacetyl) - 1,2,3,6,7,8,9, 10,11,12,13,14,16,17 - tetradecahydro - 15H-cyclopenta[a]phenanthrene-3,11-dione has the structural formula

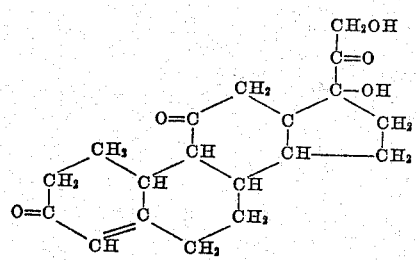

I claim:
1. A compound of the structural formula

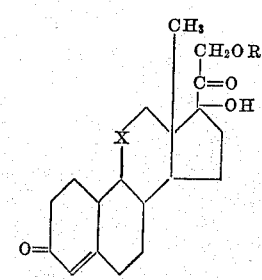

wherein X is a member of the class consisting of carbinol and carbonyl radicals, and R is a member of the class consisting of hydrogen and (lower alkyl)-CO— radicals.

2. 13-Methyl-11β,17 - dihydroxy-17 - (β-hydroxyacetyl) - 1,2,3,6,7,8,9,10,11,12,13,14,16,17 - tetradecahydro-15H-cyclopental[a]phenanthrene-3-one.

3. 13-Methyl- 17-hydroxy-17 - (β-hydroxyacetyl)-1,2,3,6,7,8,9,10,11,12,13,14,16,17 - tetradecahydro - 15H-cyclopenta[a]phenanthrene-3,11-dione.

4. 13-Methyl - 11β,17-dihydroxy-17 - (β-acetoxyacetyl) - 1,2,3,6,7,8,9,10,11,12,13,14,16,17 - tetradecahydro-15H-cyclopenta[a]phenanthrene-3-one.

5. 13-Methyl-17-hydroxy-17 - (β-acetoxyacetyl) - 1,2,3,6,7,8,9,10,11,12,13,14,16,17 - tetradecahydro - 15H-cycolepenta[a]phenanthrene-3,11-dione.

6. An acetate of the compound of the structural formula

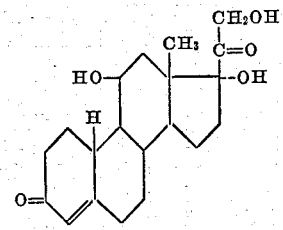

References Cited in the file of this patent
UNITED STATES PATENTS
2,183,589    Reichstein _____ Dec. 19, 1939